United States Patent [19]
Orthuber

[11] 3,863,093
[45] Jan. 28, 1975

[54] MULTICOLOR DIRECT VIEW DEVICE

[75] Inventor: Richard Kaspar Orthuber, Sepulveda, Calif.

[73] Assignee: International Telephone and Telegraph Corporation, New York, N.Y.

[22] Filed: Jan. 30, 1969

[21] Appl. No.: 797,372

[52] U.S. Cl............... 315/12, 313/103, 313/101, 250/213, 250/385
[51] Int. Cl............................................ H01j 29/70
[58] Field of Search............ 178/5.4, 5.4 R; 313/68, 313/103, 94, 101, 95; 315/11, 12; 250/213, 370, 385

[56] References Cited
UNITED STATES PATENTS

| | | | |
|---|---|---|---|
| 2,713,083 | 7/1955 | Tamer................................ | 178/5.4 |
| 3,244,921 | 4/1966 | Behun................................ | 313/94 |
| 3,303,273 | 2/1967 | Williams............................ | 178/5.4 |
| 3,418,517 | 12/1968 | Corpew............................. | 178/5.4 X |

Primary Examiner—Maynard R. Wilbur
Assistant Examiner—J. M. Potenza
Attorney, Agent, or Firm—John T. O'Halloran; Menotti Lombardi, Jr.; Edward Goldberg

[57] ABSTRACT

The invention includes an image converter or image intensifier for night reconnaissance in military applications or the like. It is a feature of the invention that a multicolored picture is produced. In one embodiment identical multicolored photographic film positives are pasted onto the front and back of a conventional black and white direct view electron tube. The films may be color transparencies. With special color patterns, it is possible to obtain a bright colored picture of a scene illuminated at very low light levels, e.g., at night. It is also a feature of the invention that special films are used with apparatus to vibrate the tube to produce a colored picture of improved resolution.

13 Claims, 5 Drawing Figures

TUBE DISPLACEMENT
PEAK-TO-PEAK

D = 3W, 6W, 9W.......

INVENTOR.
R. K. ORTHUBER
BY
ATTORNEY

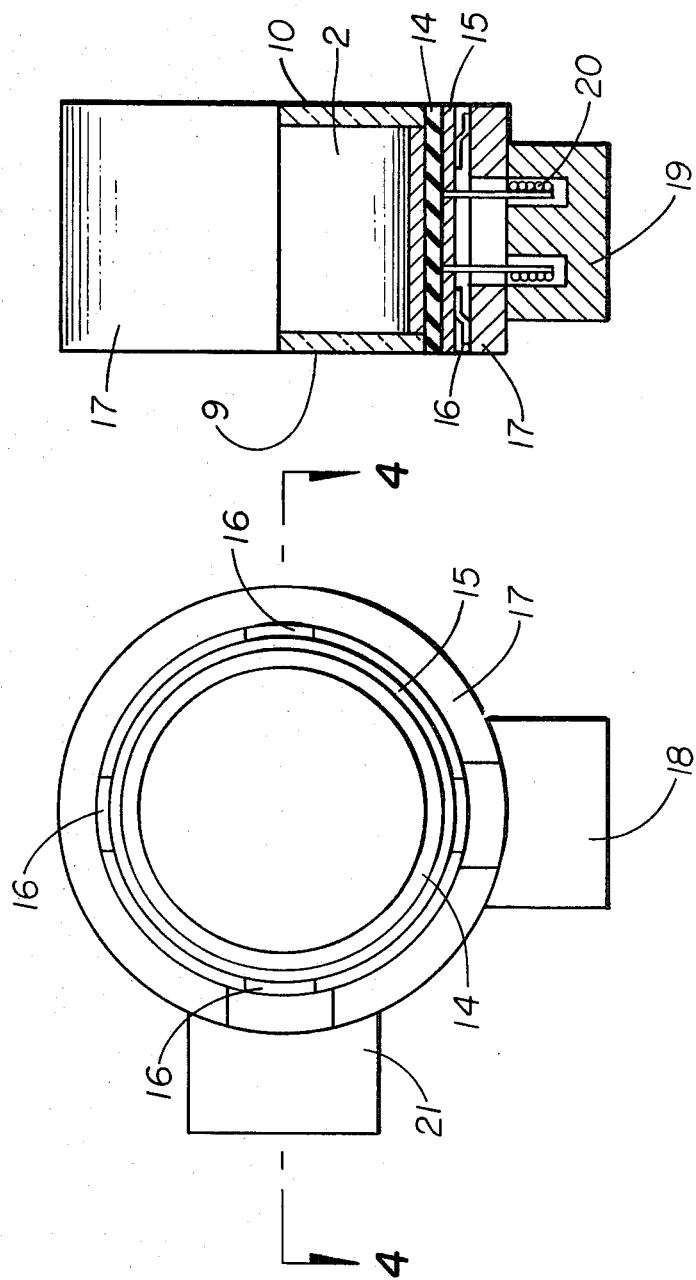

MULTICOLOR DIRECT VIEW DEVICE

BACKGROUND OF THE INVENTION

This invention relates to devices for producing a brightened image of a scene illuminated by a small amount of light, e.g., at night, and more particularly to a multicolor low light direct view device.

The invention will have a large scope of application and should not be limited to that disclosed herein. However, the invention has been found especially useful when employed as an aid to night reconnaissance in time of war. The invention may, for example, be employed to produce a rather bright colored image of a night scene which is illuminated at low levels even less than moonlight.

Image converters and image intensifiers for improving night vision have been made and used to advantage in the past. However, these devices mainly have produced black and white images. As a result, a considerable amount of information is lost which could otherwise be obtained from a colored image. For example, brightly colored objects or objects having a certain color often are more noticeable in a colored picture than they are in a black and white picture. This is especially true where there is little luminance contrast, where there is little light, and where the object is small in size.

Efforts have been made to construct a night vision color device. For example, such a device is described by G. A. Morton in *Applied Optics*, June, 1964, Vol. 3, No. 6, pages 671-672. However, prior art color devices have been relatively heavy and large in size. They also have been relatively complicated and have required considerable power. The Morton device utilized rotating, segmented color filter wheels at the input and output of an intensifier tube. A "field sequential" approach was thus used. However, the complexity of this equipment is evident.

SUMMARY OF THE INVENTION

In accordance with the device of the present invention, the above-described and other disadvantages of the prior art are overcome by providing a conventional black and white night vision tube with a multicolored transparent layer or film at the input and the output of the tube. When, for example, three colors are uniformly distributed in a large number of contiguous small areas over the films and the films are accurately aligned, it is possible to obtain a colored picture.

If the colors in the output film are identical to those of the input film and the same pattern is used, a colored picture may be produced which is a reproduction of the colors appearing in the scene being viewed. If different colors are used in the output film (color coding) some advantage may be derived.

For example, display of an inconspicuous input color, which is nevertheless target related, as a highly conspicuous output color may facilitate and speed up the recognition of objects of special interest. Areas camouflaged in olive drab may thus be displayed in a highly conspicuous hue such as red.

By a suitable selection of colors for both input and output films it is also possible to reproduce small chromaticity differences in the input by large chromaticity differences in the output. This procedure is highly useful for the detection of camouflaged targets (color contrast enhancement).

It is also a feature of the invention that a special set of input and output films are employed with means to vibrate the tube. According to this feature, a colored picture may be produced with a highlight resolving power even superior to that of a black and white instrument.

From the foregoing, it will be appreciated that a colored picture may be produced with the invention by a relatively simple apparatus. The vibrating apparatus may also be quite unsophisticated.

The above-described and other advantages of the present invention will be better understood from the following description when considered in connection with the accompanying drawings.

BRIEF DESCRIPTION OF THE DRAWINGS

In the drawings, which are to be regarded as merely illustrative:

FIG. 3 is a front elevational view of an alternative embodiment of the invention;

FIG. 4 is a side elevational view, partly in section, of the embodiment shown in FIG. 3.

DESCRIPTION OF THE PREFERRED EMBODIMENT

Figure 1:
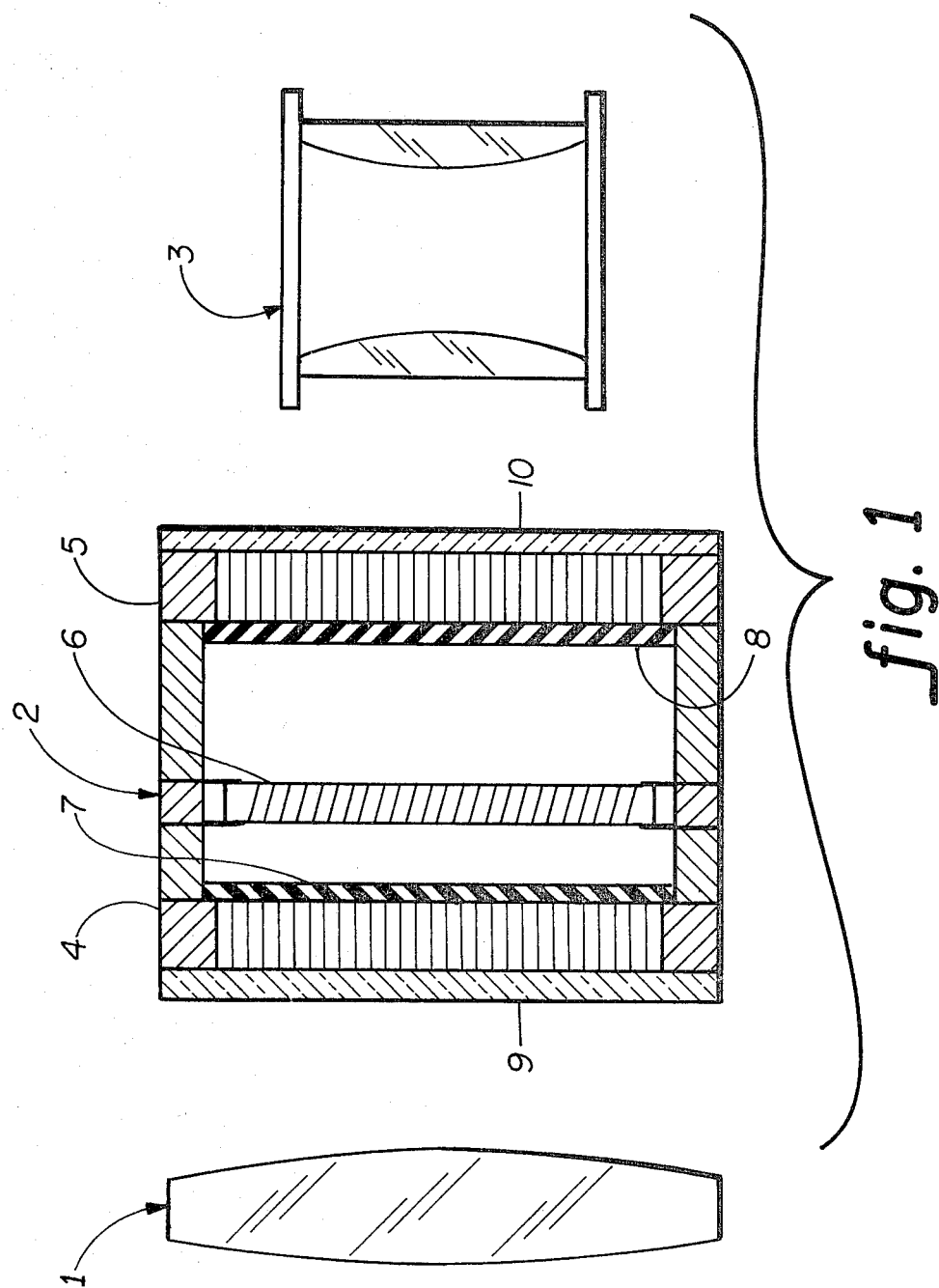
FIG. 1 is a diagrammatic view of one embodiment of the present invention.

A tricolor night viewing device is shown in FIG. 1 including a proximity focused intensifier tube 2, and an eyepiece 3. Tube 2 includes an input window 4 and an output window 5. A photocathode layer 7 is fixed to window 4. A conventional channel-type electron multiplier 6 is supported intermediate windows 4 and 5. Multiplier 6 has a great many small holes therethrough. The multiplier is made of glass. The interior of the holes support secondary emission. A perforate conductive layer is positioned on each side of the glass. When the right layer is maintained positive with respect to the left electrons pass through the left layer holes and are "multiplied" inside the holes. The conductive layer perforations lie in registry with the glass holes.

Both the input window 4 and the output window 5 of the intensifier tube 2 are conventionally constructed of fiber optics elements with parallel fibers, so that the images on both sides of the windows are congruent. The same condition applies to multiplier 6. Multiplier 6 serves to intensify the electron image emanating from photocathode 7 by several orders of magnitude prior to impact on a phosphor layer 8 which is fixed to window 5.

It is desirable that the intensified electron image impacting on phosphor 8 is congruent to that emitted from photocathode 7. This means that the electron optical conditions are suitable for establishing essentially zero distortion and unity magnification. The application of electronic proximity focus in the intensifier takes care of this condition and besides assures that uniform and high resolution is assured in the entire field covered by the tube.

Intensifier tube 2 may be entirely conventional with the exception of an input-filter-mosaic (IFM) 9 and an output-filter-mosaic (OFM) 10. Tube 2, without IFM 9 and OFM 10, is however, only black-and-white capable. It is now proposed that tricolor performance be added to tube 2 by:

1. Choosing a phosphor cathodoluminescent throughout the visible spectrum, e.g. P4 or a mixture of P22R + P22G + P22B.
2. Adding the two elements indicated in FIG. 1 indicated by numerals 9 and 10.

Both filter mosaics are formed by thin optical flats whioch are fixed in direct mechanical contact with the input and output surface of the intensifier tube. The optical properties of these elements are adjusted so that small area-elements of the filters are selectively transmissive in different bands of the optical spectrum, which may include the ultraviolet and infrared region.

Figure 2:
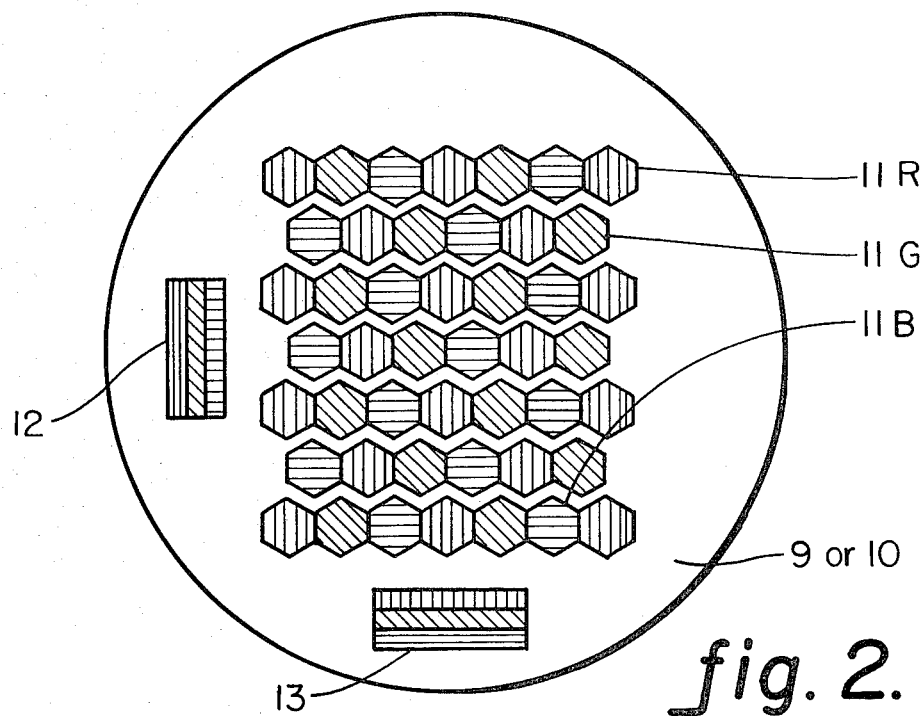
FIG. 2 is a front elevational view of a color transparency employed with the invention.

An example of this distribution is shown in FIG. 2 in which these elements are of hexagonal shape and are transmissive in either the red 11R, or the green 11G, or the blue 11B band of the visible spectrum. The size of these elements is chosen so that their diameter is not smaller than that of a resolution element of the objective-tube combination and not larger than a small multiple of this resolution element.

At the present state-of-the-art, the size of the resolution elements is of the order of 0.02 mm diameter. A minimum (corner-to-corner) diameter of the hexagonal filter elements in FIG. 2 of approximately 0.03 mm is, therefore, recommended preliminarily but may be reduced if the resolving power of conventional intensifier tubes improve.

FIG. 2 represents the IMF 9 and the OMF 10 with the red, green, and blue transmissive filter elements 11R, 11G, and 11B shown exaggerated substantially in size as compared to the filter mosaics 9 and 10. The hexagonal array of filter elements shown in FIG. 2 is seen to consist of a multitude of "triads" of red, green, and blue elements distributed around each corner of each element. This arrangement is similar to the phosphor dot triads forming the display elements in the familiar Shadowmask Color-Kinescope used in commercial color television. However, in FIG. 2 the "triads" are tightly packed to establish efficient use of the incident or emitted light flux and not separated by "inert space" as in the Shadowmask Kinescope. Two small reference fields 12 and 13 consisting, respectively, of vertically and horizontally oriented bar patterns of one or more linear color triplets are provided near the rim of the IFM 9 and OFM 10. These fields serve to facilitate the alignment of the two filter mosaics, as will be described later.

IFM 9 and OFM 10 are mounted either close to or in contact with the fiber windows 4 and 5 so that elements of the phosphor 8 associated with a red (or green or blue) element of the OFM 10 are excited exclusively or predominately by electrons from elements of photocathode 7 which are associated with a corresponding, e.g. red (or green or blue) transmissive elements of the IFM 9. The output surface of the tube will then reproduce a set of dot-interlaced color separations of a multicolored input image. If observed with proper magnification, these separations will merge into a similar multicolored but vastly intensified image permitting photopic color vision under conditions where otherwise the illumination level would permit only scotopic viewing or even no vision at all.

The color viewing procedure achieved in this way is related to some degree with a known scheme of color photography commonly designated as the "Screen Plate Process". This process and various commercial applications of it have been supplanted by dye-coupling processes and are, like the proposed color intensifier viewer, based on the establishment of spatially interlaced color separations by recording and viewing through a tricolor-mosaic, which in this case is designated as a "screen plate". The proposed tricolor viewer differs from the photographic screen plate process mainly by the need of "taking" and "viewing" at the same time with two registered filter mosaics, whereas in the screen plate process only one mosaic is required since taking and viewing are not simultaneous.

The above-described viewing device of FIGS. 1 and 2 has the advantage of superior simplicity but is affected by resolution limitations in the sense that its resolving power with respect to spatial color variations is less than its limiting resolution for black-and-white detail. This is due to the fact that the filter elements of the IMF 9 and OMF 10 have to be at least the size of the intensifiers black-white resolution and that a minimum of three such elements are required to define the chromaticity of an element.

This disadvantage can be circumvented by introducing a periodic (oscillatory or circular) displacement of the intensifier tube 2 with respect to the optical input and output images. This may be done by keeping the tube 2 (with filter mosaics attached in registration), the objective 1 and the eyepiece 3 stationary and deflecting the input image by means of a rotating prism or a rotating tilted plane-parallel plate across the input window 4 of the tube. The resulting circular deflection of the intensified image on the output window 5 can then be compensated by a second image deflector between tube 2 and eyepiece 3.

An alternate method, which would not require image deflecting elements, consists in keeping the optical components 1 and 3 and thus the optical images stationary within the viewer but mechanically displacing the tube 2 with low frequency and small amplitude, with respect to the images.

Figure 5:
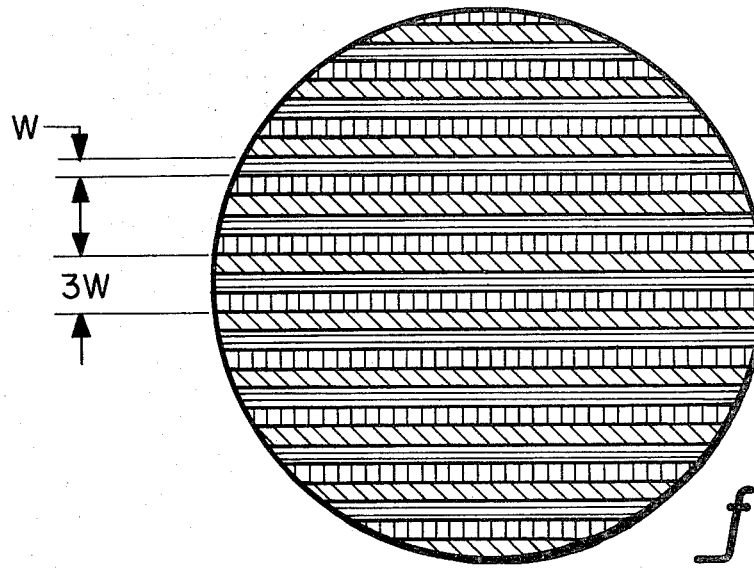
FIG. 5 is a front elevational view of a color transparency employed in the embodiment shown in FIGS. 3 and 4.

FIGS. 3, 4 and 5 show a tube mount suitable to produce the desired periodic tube displacement. Tube 2 with filter mosaics 9 and 10 attached in registry through the tube is shown potted by means of an insulating filler 14 into a lightweight metal cylinder 15. Attached to this cylinder are four pairs of leaf springs 16 located on two mutually perpendicular diameters, which serve to support the tube elastically within a rigid mounting frame 17.

On the bottom of the frame, a mechanical driver 18 is provided which, in the drawing, is essentially a loud speaker driver consisting of a permanent magnet 19 with a cylindrical air gap acting on a light solenoid 20 which is rigidly connected to cylinder 15. Feeding suitable a.c. power into solenoid 20, the tube is displaceable in perpendicular direction with a variety of wave shapes, such as sinusoidal, triangular, or randomly. If it be desirable to establish displacement in a horizontal direction simultaneously, this is readily accomplished by adding another driver 21 to generate circular, elliptical, random, etc., tube displacements.

The operation of the embodiment of FIGS. 3, 4 and 5 will now be considered for the specific case that:

1. The tube displacement is unidirectional so that the tube position vs. time function is approximated by a triangular wave, or the tube velocity $$v = \pm v_o \quad (v_o = \text{constant}) \quad (2-1)$$

This requires, of course, only one driver, e.g. 18 in FIG. 4.

2. The transmission patterns on both filter mosaics are parallel bar patterns with bars oriented normal to the tube displacement and forming a series of bar trios transmissive alternately in the red, green, and blue bands of the visible spectrum. This is illustrated in FIG. 5.

The width, $W$, of the filter strips does not necessarily have to be restricted to a small multiple of the basic tube resolution element as was required for the filter elements of the embodiment of FIGS. 1 and 2. On the contrary, in this device it is preferable to make them considerably larger than the black-white resolution elements of diameter $s$, or $$W = ms \quad m \gg 1 \text{ (e.g. 5-10)} \quad (2-2)$$

However, a practical limitation to $W$ is set by the condition $$W = D/3n \quad (n = 1 \text{ or } 2 \text{ or } 3 \ldots) \quad (2-3)$$

where $D$ is the peak-to-peak displacement of the tube with attached filter mosaics.

Condition (2-3) assures that during each period of tube displacement each resolution-element of the optical input image and, thus, the electron optical output image sweeps across the red, green, and blue strips the same integral number of times. If, in addition, according to (2-1) this sweep is performed with uniform speed each image element is within a displacement period viewed sequentially in all three principal colors for the same total dwell-time, regardless of its positon with respect to the tricolor grid.

Not meeting these conditions would cause preferential treatment of one or two of the primary colors with the preferred colors varying with the position in the field of view. The embodiment of FIGS. 3, 4 and 5 presents, at the same time, line-interlaced field segments in all three primary colors.

The advantage of the embodiment of FIGS. 3, 4 and 5 can, thus, be summarized as follows:

1. The line-interlaced operation will reduce luminance or color flicker over that produced by the Morton device.
2. It will not require the bulky and fast moving separation filter arrangements required for conventional field sequential scotoscopes.
3. Color impurities caused by distortion-induced misregistration of input and output color filters are absent due to the properties of the applied image intensifier.
4. Color-shading is avoided.

With respect to resolution, embodiment of FIGS. 3, 4, and 5 is superior to the stationary filter type for two reasons:

1. The image presented is not formed by groups of three colored simultaneously observed elements, but by time sequential presentation of three elements all resolved to the limits of the intensifier operated in black and white.
2. Resolution limitations imposed by the structure of image transfer elements, such as fiber optical plates and electron multiplier plates, can be improved by motion of these elements across the image "Dynamic Scanning". For this reason, the device of FIGS. 3, 4 and 5 will show better resolution in black and white as well as in color than a conventional viewer using the same intensifier.

The periodic tube-displacement has to be performed with a frequency high enough to accomplish merging of the subsequent outputs without noticeable flicker. Due to the just-mentioned line-interlaced presentation, this is easily possible if all three color separations are presented within 1/20 or about one-half the eye storage time. Also, commercial P4 or P22 phosphors are fast enough for this operation corresponding to 60 cps field frequency. $f = 20$ sweep/second will, on the other hand, require a triangular wave driving a.c. of 10 cps which, considering the need for accommodating the lower harmonics, will require a reasonably flat frequency response up to about 50 cps.

The drive amplitude and accelerations are determined by a choice of the maximum displacement, which according to (2-3) has to be at least $D = 3W$, where $W$ the width of a strip, with (2-2) $D = 3 ms$, where $s$ is the width of a resolution element.

Assuming now $s \leq 1/30$ mm, equivalent to 30 1/mm, and determining color purity in terms of the dwell time of an image element on a strip relative to the swell time on a filter strip boundary, by $m = 10$, the peak to peak tube deflection required becomes $D = 1$ mm. The width of the filter strip is, then, $W = \frac{1}{3}$ mm, and for a typical 22 mm diameter display field a total number of 66 color strips are required on the IFM and OFM.

Finally, it should be checked if the chosen conditions of trangular-wave displacement with $f = 20$ cps and $D = 1$ mm peak-to-peak amplitude are sensible with respect to acceleration. Of course, an ideal triangular wave would require infinite acceleration at the maximum excursion points and is unfeasible. However, an approximation such that velocity reversal is restricted to 10 percent of the duration of a single sweep will not seriously affect the operation. In this case, the acceleration $a$ would be $$a = \text{Velocity change at reversal/Reversal time} = 20$$
$$Df^2(\text{mm/sec}^2) = 8\text{m/sec}^2 \sim 0.8G$$

This acceleration of $0.8G$ is well within mechanical specifications for conventional intensifier tubes, and the accelerating problem too is quite manageable. Since the mass to be accelerated is essentially only the intensifier tube, which for 22 mm field diameter weighs only ~50g, the reaction forces on the viewer device proper will also be small and can be, if desired, easily cancelled by dynamic balancing of the system.

The following table serves to summarize some of the basic design data which may be used for the viewer.

Table 1

Preliminary Design Data for the Tricolor Viewer

| | |
|---|---|
| Usable Field Diameter: | 22mm |
| Intensifier Weight: | ~50 grams |
| IFM-OFM Pattern: | Parallel Bar |
| IFM-OFM Strip Width: | ⅓ mm |
| IFM-OFM Strip Number: | 66 |
| Tube Displacement: | 1 mm peak-to-peak |
| Sweep Frequency: | 20 sec$^{-1}$ |
| Sweep Reversal Time: | .005 seconds |
| Tube Acceleration: | .8 G maximum |

The discussion presented so far has been restricted to a general configurational and operational description without considering specific preparation and alignment procedures.

This section will deal with some of these procedures. They are:
1. The preparation of filter mosaics,
2. The alignment of IFM and OFM,
3. The use of a "wide band" high resolution phosphor.

As mentioned earlier, filter mosaics have previously been used in the process of Screen Plate-Color Photography, where those filters were usually mechanically integrated with the photographic emulsion. Though the techniques used then could be applied now, it is much simpler to take advantage of modern color photographic means to prepare the IFM and OFM.

It is preferred to prepare the IFM by the use of a light projector with filters. The light leaving the filter can illuminate a mechanical mask containing a set of parallel slits spaced by twice their width or slightly more. In the case of preparation of a mask for the FIG. 5 pattern in accordance with the choice previously made, the number of slits would be 66. Their width would be 1/M mm, where M is the magnification in the photographic reproduction (M<<1). In the case of a mask for the FIG. 2 pattern which may (but do not have to) use hexagonal elements, the mask would be provided with hexagonal apertures for one color only. Shifting this mask by 120° displacements, the pattern would be obtained in three subsequent red, green, and blue exposures, using a different filter each time.

After taking a red picture of the mask slits, the filter is changed from red to green transmissive, the mask moved by one slit width (or slightly more) in a direction normal to the slits, and a second picture is taken on the same film. The same process is repeated with a blue filter to complete the preparation of one of the filter mosaics, e.g. the IFM. To produce a registrable mate to this filter, it must be considered that the two filters have to be used in opposite direction if the emulsion is in contact with the fiber windows of the tube. Therefore, the color transparencies have to be mirror-images of each other as seen from the same side.

If in the first steps described above an IFM was produced, the mating OFM can be produced in the same way.

An alternate method of preparing a registrable mate to an IFM may consist in contact-printing one from the other.

This procedure will, however, not be suitable if the filter pairs are to be used in a mode other than color reproduction, e.g. Color Coding or Camouflage Breaking. In these two cases the corresponding elements on the IFM and OFM will, in general, have different transmission spectra and, particularly in the latter case, it may become necessary to produce the IFM by deposition of interferometric stacks for attainment of very sharp spectral discrimination.

Black-white phosphors for image tube applications are usually of the P20 type which are available combining high efficiency and high resolution. However, the P20 is unsatisfactory in blue response thus the P20 type may be used if a blue response is not imperative in the practice of the present invention.

A P4 phosphor, a composite of ZnS:Ag and ZnCdS:Ag, is applied in commercial television Kinescopes and is satisfactorily responsive throughout the visible spectrum for use in the practice of the invention.

A mixture of P22B, P22G, and P22R—the three phosphor types used in Color Kinescopes—may be used with the invention although these types are more effective in the red and somewhat less white responsive than the P4.

A mixture of high resolution P20 with an addition of the highly blue responsive P22B (ZnS:Ag) is a combination that is the same as the P4, and may be used with the invention. Using the fine grain type P20 in this combination instead of the coarse yellow green ZnCdS:Ag type contained in commercial P4's, an improved resolution results. A small amount of P22R may be added for enhancement of red response, if desired.

In both systems so far discussed, adequate registration of the IFM and OFM to within a fraction of the basic black-and-white resolution will lead to a significant performance gain. In the case of the FIG. 1 embodiment degradation due to inadequate registration would consist in an inability to achieve color saturation; in the FIG. 4 embodiment unwanted false color patterns and fringes result from inadequate registration of the two filter mosaics.

The accomplishment of adequate registration is based on three prerequisites:
1. Image transfer through the tube must be undistorted within a fraction of a resolution element.
2. The color diapositives forming the filter mosaics must be mirror duplicates of each other, but otherwise congruent with respect to the boundaries of the filter elements to within a fraction of an image element.
3. The mating filter mosaics must be attached to the tube so that the OFM coincides with the electron image of the IFM and it appears on the phosphor, also to within a fraction of the basic tube element.

The first of these conditions is met by the choice of a proximity focusing intensifier. The second condition can be met by preparing the filter mosaics according to the recommendations set forth hereinbelow. The third condition requires some further discussion, since the mutual alignment tolerances of the two filters with a well-resolving tube will require positioning accuracy of 2 to 4 microns.

The remainder of this section will describe a procedure which facilitates this alignment. This procedure comprises (in the case of strip filters) the following steps:
1. Cementing the IFM onto the input fiber window of the intensifier tube with the emulsion making contact.
2. Mounting the intensifier tube in a rigid fixture which permits uniform flooding of the IFM with narrow band light transmitted by only one type of the filter elements, operating the tube and microscope observation of the output.
3. Precise manipulation of the OFM on the output window to accomplish an output of strips uniform in hue along their entire length and without color fringes. If color reproduction is required, the hue in the displayed strip pattern should be similar to that of the flooding light.
4. Cementing the OFM onto the output fiber window without changing its position established in step 3.

What is claimed is:

1. A multicolor, low light, direct view device comprising: an evacuated envelope having a light transparent input fiber optics window and a parallel light transparent output window; a channel-type electron multiplier fixed in said envelope between and parallel to said windows; a photocathode fixed in said envelope in a plane parallel to said input window and said multiplier; a luminescent screen fixed in said envelope in a plane parallel to said output window between said multiplier and said output window; said input window including a first transparent layer having a plurality of small areas of at least two first colors, said first colors being different from each other and being located contiguous to each other over the total area of said first layer, said first colors being uniformly distributed over the total area of said layer; said output window including a second transparent layer having a plurality of small areas of second colors, said second colors being different from each other and being located contiguous to each other over the total area of said second layer, each small area in said first layer having a corresponding small area in said second layer of the same size and location, all of the small areas of said first layer having one color only also having corresponding small areas in said second layer of one color only, said layers being fixed relative to said envelope, all the small areas of said layers being in axial alignment with each other; and carrier means to support said envelope.

2. The invention as defined in claim 1, wherein said layers are color transparencies of photographic film.

3. The invention as defined in claim 2, wherein said small areas are colored red, green and blue, said red, green and blue areas being uniformly distributed over the total areas of said layers.

4. The invention as defined in claim 3, wherein said small areas are rows of equilateral hexagons every third one of which is the same color, the same color in one row being located midway between the same colors in the next adjacent row.

5. The invention as defined in claim 1, wherein said carrier means includes means to move said envelope in a direction perpendicular to its viewing axis.

6. The invention as defined in claim 5, wherein said carrier means includes means to reciprocate said envelope in a direction perpendicular to its viewing axis.

7. The invention as defined in claim 6 wherein said carrier means includes a base, and spring means to hold said envelope away from said base.

8. The invention as defined in claim 7 wherein said small areas of both of said layers are contiguous strips of uniform width running perpendicular to the direction of reciprocation of said envelope, said strips being red, green and blue, every third strip being red and having a blue strip on one side thereof and a green strip on the other side thereof.

9. The invention as defined in claim 1, wherein said carrier means includes means to reciprocate said envelope in a direction perpendicular to its viewing axis, said small areas of both of said layers being contiguous strips running perpendicular to the direction of reciprocation, each strip having a uniform width throughout its entire length, all the strips of the same color having the same width.

10. The invention as defined in claim 9 wherein said strips are red, green and blue, every third strip being red and having a blue strip on one side thereof and a green strip on the other side thereof.

11. The invention as defined in claim 1, wherein said carrier means includes means to move said envelope in a direction perpendicular to its viewing axis at substantially constant velocities in both directions.

12. The invention as defined in claim 11, wherein said small areas of both of said layers are contiguous strips of uniform width running perpendicular to the direction of reciprocation of said envelope, said strips being red, green and blue, every third strip being red and having a blue strip on one side thereof and a green strip on the other side thereof.

13. The invention as defined in claim 1, wherein said carrier means includes means to reciprocate said envelope in a direction perpendicular to its viewing axis, said small areas of both of said layers being contiguous strips of uniform width running perpendicular to the direction of reciprocation, said strips being arranged in identical groups of three different colors, each color having the same strip width, said reciprocation means being adapted to reciprocate said envelope a maximum distance in one direction equal to $3nW$, where $n$ is any positive integer and $W$ is the width of one of said strips.

* * * * *